(12) United States Patent
Moufti

(10) Patent No.: US 11,512,875 B2
(45) Date of Patent: Nov. 29, 2022

(54) LASER BASED WATER HEATING ELEMENT

(71) Applicant: Ziad Moufti, Dubai (AE)

(72) Inventor: Ziad Moufti, Dubai (AE)

( * ) Notice: Subject to any disclaimer, the term of this patent is extended or adjusted under 35 U.S.C. 154(b) by 350 days.

(21) Appl. No.: 16/785,156

(22) Filed: Feb. 7, 2020

(65) Prior Publication Data

US 2021/0247104 A1 Aug. 12, 2021

(51) Int. Cl.
*F24H 9/1818* (2022.01)
*F24H 9/00* (2022.01)
*H01S 3/00* (2006.01)
*F24H 1/00* (2022.01)
*F24D 17/00* (2022.01)

(52) U.S. Cl.
CPC ......... *F24H 9/1818* (2013.01); *F24H 1/0018* (2013.01); *F24H 9/0021* (2013.01); *H01S 3/0007* (2013.01); *F24D 17/0089* (2013.01)

(58) Field of Classification Search
None
See application file for complete search history.

(56) References Cited

U.S. PATENT DOCUMENTS

| | | | | |
|---|---|---|---|---|
| 1,361,795 A | * | 12/1920 | Latham | F24H 3/006 237/16 |
| 1,517,301 A | * | 12/1924 | Mcmichael | H05B 3/82 219/205 |
| 2,030,937 A | * | 2/1936 | Reichmann | F23Q 7/001 219/205 |
| 2,943,174 A | * | 6/1960 | Parker | H05H 1/02 219/121.52 |
| 3,138,697 A | * | 6/1964 | Maggio | H05B 3/00 392/407 |
| 3,769,493 A | * | 10/1973 | Zeitlin | H05B 3/06 219/544 |
| 3,970,816 A | * | 7/1976 | Hosokawa | H05B 3/82 338/264 |
| 4,389,560 A | * | 6/1983 | Mitchell | C23C 8/10 219/121.6 |
| 4,480,174 A | * | 10/1984 | Hummel | H05B 3/44 219/205 |
| 4,534,811 A | * | 8/1985 | Ainslie | B23K 26/06 219/56.22 |
| 4,627,435 A | * | 12/1986 | Hoskin | A61B 17/3211 219/233 |
| 4,644,169 A | * | 2/1987 | Hunt | F22B 1/00 60/203.1 |
| 4,658,115 A | * | 4/1987 | Heath | F22B 1/00 219/121.85 |

(Continued)

*Primary Examiner* — Thor S Campbell
(74) *Attorney, Agent, or Firm* — Cozen O'Connor

(57) ABSTRACT

A laser based water heating element formed from at least two components, e.g., a shaft and a laser beam generator, wherein the shaft and laser beam generator of the laser based water heating element are axially aligned, i.e., the shaft is centered on the laser beam generator, where the laser beam generator is a self-contained green, infrared and red-line laser module with an integrated laser driver circuit, optics and laser diode such that, in operation, the laser beam generator generates a laser beam with an output power that is sufficient to cause the shaft to generate radiant heat and thereby cause the temperature of water within a water heater to rise.

10 Claims, 7 Drawing Sheets

(56) References Cited

U.S. PATENT DOCUMENTS

| | | | | |
|---|---|---|---|---|
| 4,797,535 A * | 1/1989 | Martin | ............... | F24H 1/225 |
| | | | | 313/15 |
| 4,864,098 A * | 9/1989 | Basanese | ............ | H01S 3/005 |
| | | | | 219/121.84 |
| 5,009,655 A * | 4/1991 | Daignault, Jr. | ...... | A61B 18/28 |
| | | | | 606/7 |
| 5,948,286 A * | 9/1999 | Chalco | ............... | B23K 26/06 |
| | | | | 219/121.64 |
| 6,317,559 B1 * | 11/2001 | Kim | ................... | H05B 3/06 |
| | | | | 392/455 |
| 6,792,017 B2 * | 9/2004 | Halpin | ............ | B23K 26/702 |
| | | | | 219/121.61 |
| 7,027,479 B2 * | 4/2006 | Stewart | ............... | G02B 5/24 |
| | | | | 372/98 |
| 7,576,306 B2 * | 8/2009 | Lewin | ............... | H05B 3/64 |
| | | | | 338/237 |
| 8,047,663 B2 * | 11/2011 | Pang | ............... | G02B 17/004 |
| | | | | 359/613 |
| 8,478,116 B2 * | 7/2013 | Henry | ............... | H05B 3/82 |
| | | | | 392/455 |
| 8,952,302 B2 * | 2/2015 | Park | ............... | D06F 39/04 |
| | | | | 252/519.31 |
| 9,366,455 B1 * | 6/2016 | Conemac | ............ | F24H 1/0018 |
| 2014/0061182 A1 * | 3/2014 | Fischer | ............ | B23K 3/0384 |
| | | | | 219/232 |
| 2016/0130742 A1 * | 5/2016 | Miller | ............... | D06F 58/26 |
| | | | | 34/267 |
| 2020/0390155 A1 * | 12/2020 | Schneider | ............ | A24F 40/48 |

* cited by examiner

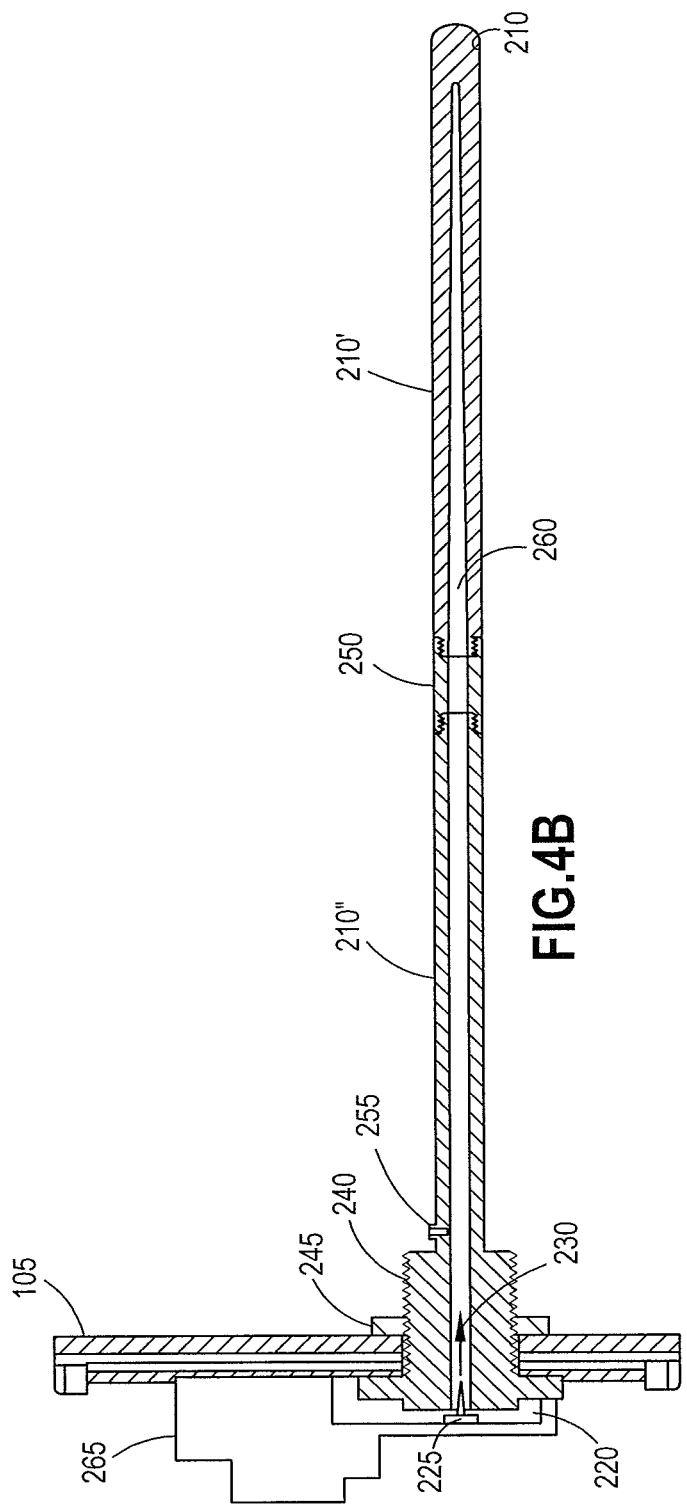

LASER BASED WATER HEATING ELEMENT

BACKGROUND OF THE INVENTION

1. Field of the Invention

The invention relates to water heater elements and, more particularly, to a laser based water heating element.

2. Description of the Related Art

Residential or commercial gas water heaters have a gas burner that heats the water below the tank, and depends on heating a copper resistance (i.e., element) to produce the heat needed to heat the water. In contrast, most residential or commercial electric water heaters have two heating elements: one near the top of the tank and one near the bottom. Power enters the top and flows to a high-temperature cutoff switch, and then to thermostats and the heating elements. The top and bottom elements are controlled by separate thermostats. When the water on the top of the tank is hot, the top element turns off and the lower element heats. The upper and lower heating elements never operate at the same time.

Conventional systems utilize the resistance of copper heating elements to produce the heat needed to raise the temperature of water. The use of systems based on the resistance copper heating elements needed for heating requires a large amount of electrical energy, which leads to the need to replace the heating elements over time. Thus, problems with little or no heat are typically caused by a failed heating element, an inexpensive part that is relatively easy to replace. Other problems may be due to improper settings, high home water pressure, or a lack of tank maintenance.

If the electric hot water heater is slow to heat, runs out of hot water faster than previously, or fails to deliver any hot water, there is a 90 percent chance that simply replacing one or both of the heating elements will solve the problem. Water heater repairs in residential water heaters are straightforward, and replacement elements for these residential water heaters are relatively inexpensive and readily available at home centers, hardware stores and appliance parts dealers.

Heating elements can burn out because they are typically made from copper, moreover. Sometimes one element fails causing the other element to work overtime. A burnt-out element is a common cause of water heater problems. A sudden lack of sufficient hot water is often a warning that a heating element has burned out. As stated, most electric water tanks have two elements. The lower element typically burns out before and more frequently than the top element simply because of sediment in the water supply and the location of the element within the tank. Another symptom of a bad element is a tank that takes longer to recharge with heated water than it had previously. Moreover, the use of a copper resistance system to produce the necessary heat requires a large amount of electrical energy. Such a requirement entails additional costs in addition to aging of the copper heating element, which leads to the necessity to replace them from time-to-time over a period of extended, long-term use.

SUMMARY OF THE INVENTION

Disclosed is a laser based water heating element that is formed from at least two components, e.g., a shaft and a laser beam generator. The shaft and laser beam generator of the laser based water heating element are axially aligned, i.e., the shaft is centered on the laser beam generator.

The laser beam generator is a self-contained green, infrared and red-line laser module with an integrated laser driver circuit, optics and laser diode. In operation, the laser beam generator generates a laser beam with an output power that is sufficient to cause the shaft to generate radiant heat and thereby cause the temperature of the water within a water heater to rise.

In accordance with the invention, the shaft has a threaded end that can pass through the wall of a water heater, which then allows securement of the shaft to a wall of the water heater via a mechanical securement device, such as a locking nut. Thus, the threaded end allows the laser based water heating element to be fixedly coupled to the wall of the water heater.

The shaft is formed from multiple pieces that are coupled together in a male/female screw type arrangement. At the end distal to the laser beam generator, i.e., an end metal part, the shaft of the laser based water heating element is formed from a metal material that varies depending on the application, i.e., the temperature requirement. In preferred embodiments, the material is titanium, tungsten or copper, where titanium/tungsten is used for commercial/industrial heaters and copper is used for domestic heaters.

At the end proximate to the laser beam generator, i.e., an end ceramic part, the shaft is made from an inorganic, nonmetallic solid ceramic material comprising nonmetal or metalloid atoms. The metal and ceramic portions of the shaft are coupled together by a metal coupling element.

In operation, the burning laser beam is generated by the laser beam generator. Heat is generated by concentrating the burning laser beam on the end metal part of the laser based water heating element. In accordance with the invention, the temperature that is generated is controlled by a computerized thermostat that can be operated via remote control.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its refinements and advantages are explained in more detail below using the drawing which illustrates an exemplary embodiment of the invention, in which:

FIG. 4B is a cross-sectional view of the laser based water heating element of FIG. 2 installed in the wall of a water heater in accordance with the invention;

DETAILED DESCRIPTION OF THE EXEMPLARY EMBODIMENTS

Figure 1:
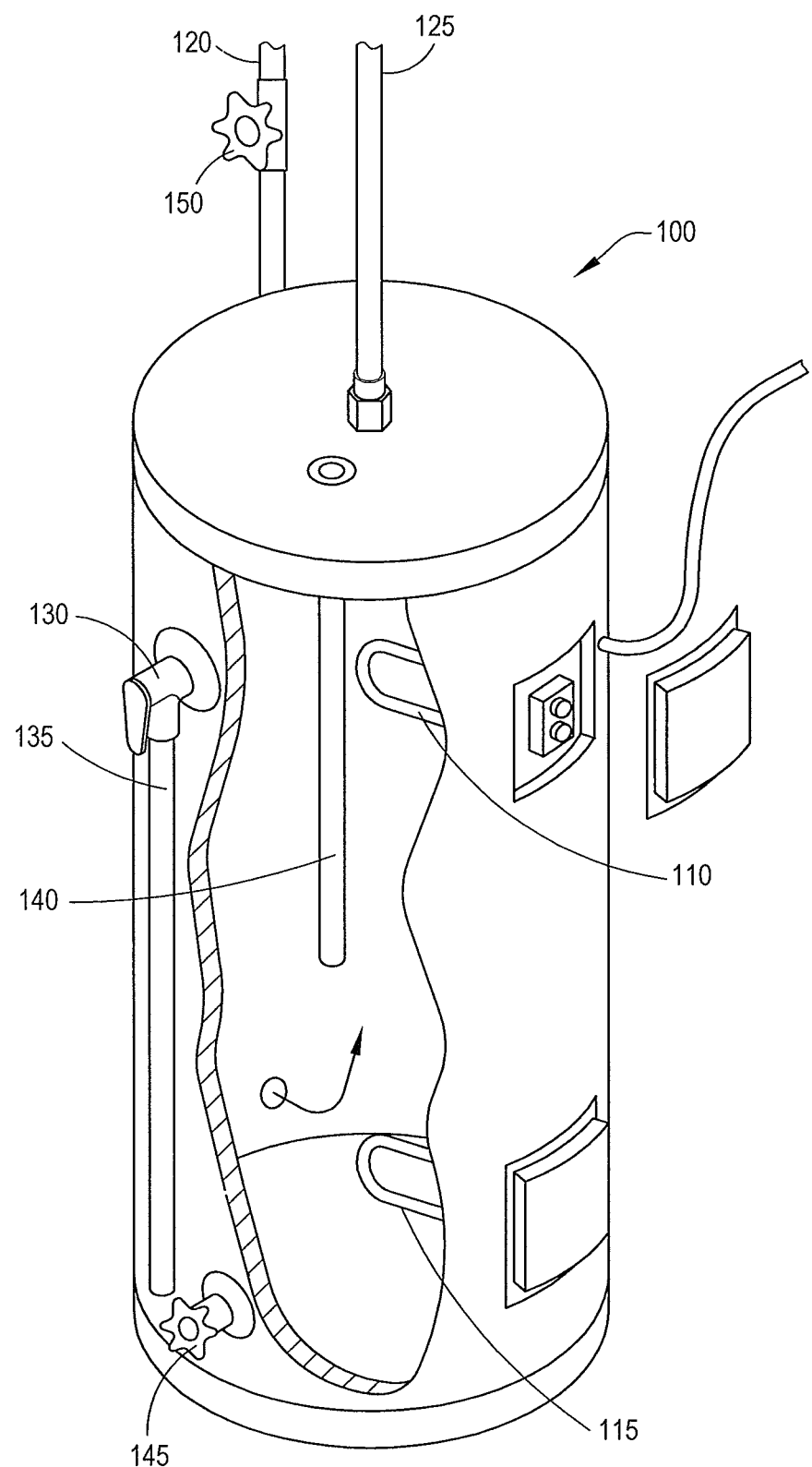
FIG. 1 is an illustration of a conventional water heating system.

FIG. 1 is an illustration of a water heater having conventional heating elements. As shown in FIG. 1, the water heater 100 includes an upper heating element 110 and a lower heating element 115. Water supply and delivery pipes, i.e., hot and cold water supply pipes 120, 125, are located on top of the water heater 100. The supply pipe 125 routes cold water to the bottom of the water heater through a dip tube (not shown). The hot-water delivery pipe 120 takes water from the top of the water heater 100. For safety, all water heaters are equipped with a T&P valve (temperature-and-pressure relief valve) 130. This valve opens if either the temperature or pressure of the water exceeds a safe limit. The valve 130 is connected to a pipe 170 that extends along the outside of the water heater 100, ending about 6 inches from the floor.

Most conventional tanks that form part of a water heater are made of steel, which is glass-lined on the inside to help prevent corrosion. A water heater also includes an anode rod 140 to control corrosion, as shown in FIG. 1. Typically, this anode rod 140 is made from magnesium, which protects the tank by corroding in place of the steel from which the tank is made. A drain valve 145 is located at the bottom of the tank for emptying the water heater 100, and a valve 150 is provided on the supply pipe 120, which allows shut down of the hot-water plumbing without affecting the cold-water supply to a house or residence.

Figure 2:
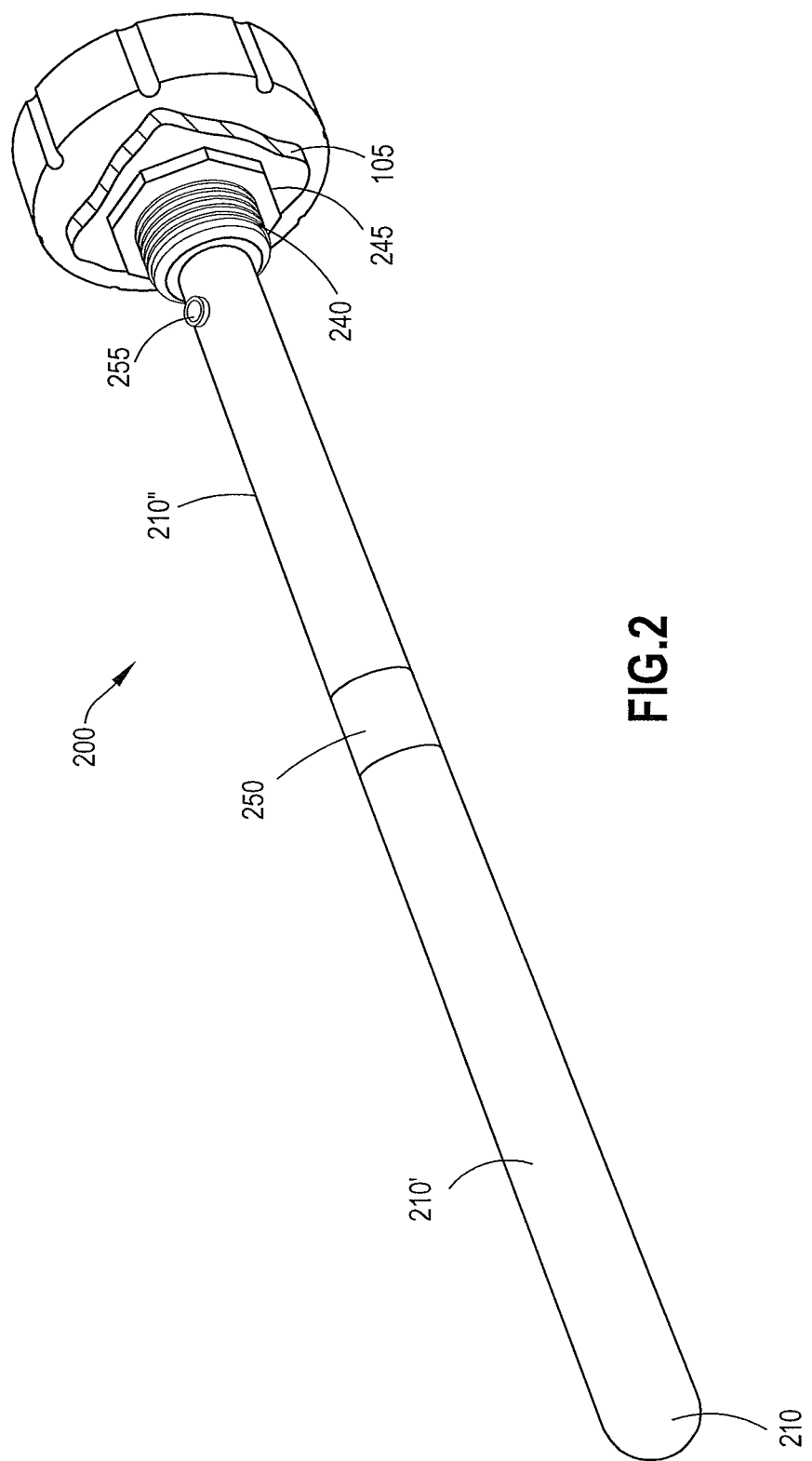
FIG. 2 is a perspective view of the laser based water heating element in accordance with the invention.

FIG. 2 is a schematic block diagram of the laser based water heating element in accordance with the invention. The laser based water heating element 200 is formed from at least two components, e.g., a shaft 210 and a laser beam generator 220 (see FIG. 4B). The shaft 210 and laser beam generator 220 of the laser based water heating element 200 are axially aligned. In other words, the shaft 210 is centered on the laser beam generator 220.

The laser beam generator 220 is a self-contained green, infrared and red-line laser module with an integrated laser driver circuit (not shown), optics (not shown) and laser diode 225. In operation, the laser beam generator 220 generates a laser beam 230 with an output power that is sufficient to cause the shaft 210 to generate radiant heat and thereby cause the temperature of the water within the water heater to rise.

As shown in FIG. 2, the shaft 210 has a threaded end 240 that can pass through the wall 105 of a water heater 100, which then allows securement of the shaft 200 to the wall 105 via a mechanical securement device, such as a locking nut 245. Thus, the threaded end 240 allows the laser based water heating element 200 to be fixedly coupled to the wall 105 of the water heater 100. It should be understood there are other ways of securing the laser based water heating element 200 to the wall 105, and it is not the intention to be limited to merely the locking nut 245 as shown.

The shaft 210 itself is formed from multiple pieces that are coupled together in a male/female screw type arrangement. At the end distal to the laser beam generator 225, i.e., an end metal part 210', the shaft 210 of the laser based water heating element 200 is formed from a metal material that varies depending on the application, i.e., the temperature requirement. In preferred embodiments, the material is titanium, tungsten or copper, where titanium/tungsten is used for commercial/industrial heaters and copper is used for domestic heaters.

Figure 3:
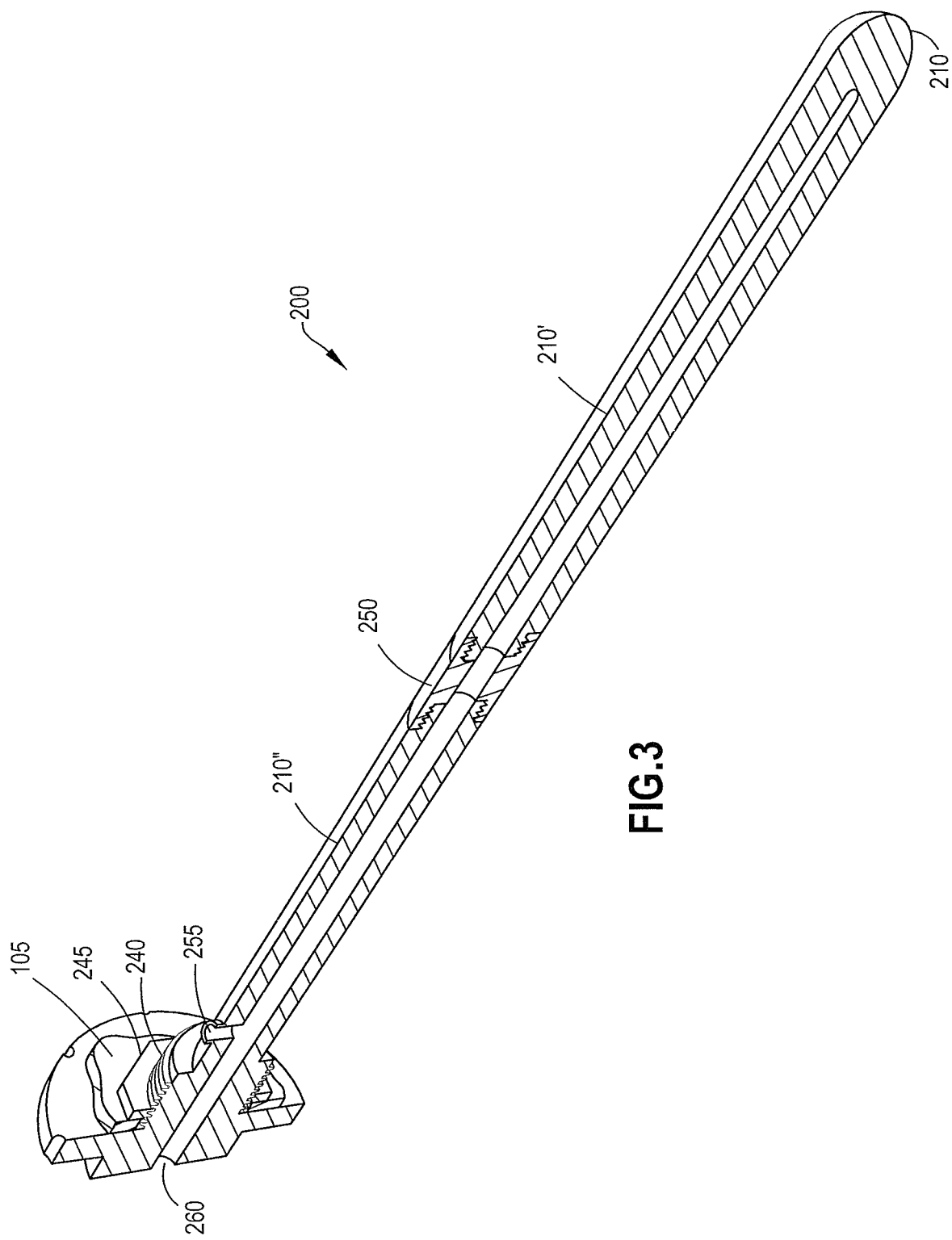
FIG. 3 is a cross-sectional view of the laser based water heating element of FIG. 2.

FIG. 3 is a cross-sectional view of the laser based water heating element 200 of FIG. 2. As shown in FIG. 2, an hollow inner area 260 extends from the end, at which the laser beam generator 220 (see FIG. 4B) is located, to the opposing end of the heating element 200. The hollow inner area 260 is sealed by a vacuum valve 255.

Figure 4A:
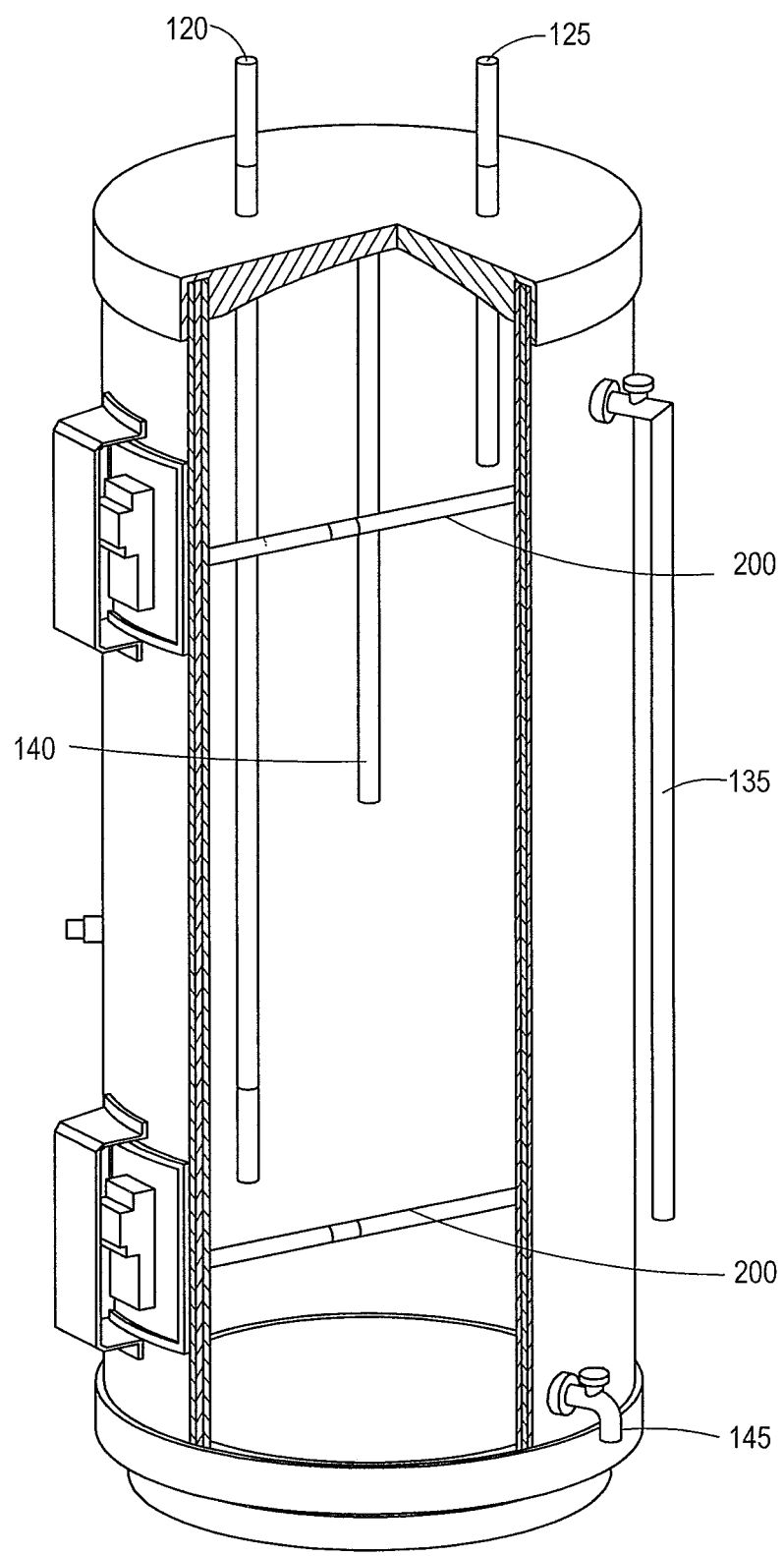
FIG. 4A is an illustration of two laser based water heating elements of FIG. 2 installed in the wall of a water heater in accordance with the invention.

FIG. 4A is an illustration of two laser based water heating elements of FIG. 2 installed in the wall of a water heater in accordance with the invention. As shown in FIG. 4, a pair of heating elements 200 are provided in upper and lower heating positions, respectively.

FIG. 4B is a cross-sectional view of the laser based water heating element of FIG. 2 installed in the wall 100 of a water heater in accordance with the invention. With reference to FIG. 4B, the outer case 265 encloses a thermostat (not shown). The thermostat is a conventional manual thermostat. In alternative embodiments, the thermostat can operated remotely via a sim card (not shown) contain in the outer case 265, where the sim card provides remote control of the thermostat via a telephone system, such as mobile cellphone technology. The outer case 265 also encloses the laser beam generator 220, where the shaft 210 is centered on the laser beam generator 220, i.e., the laser beam generator 220 and the shaft 210 are axially aligned. As stated, the laser beam generator 220 is a self-contained green, infrared and red-line laser module with an integrated laser driver circuit (not shown), optics (not shown) and laser diode 225.

At the end proximate to the laser beam generator 220, i.e., an end ceramic part 210", the shaft 210 is made from an inorganic, nonmetallic solid ceramic material comprising nonmetal or metalloid atoms. The metal and ceramic portions 210',210" of the shaft 210 are coupled together by a metal coupling element 250.

In operation, the burning laser beam 230 is generated by the laser beam generator 220. Heat is generated by concentrating the burning laser beam 230 on the end metal part 210' of the laser based water heating element 200. In accordance with the invention, the temperature that is generated is controlled by a computerized thermostat that can be operated via remote control (not shown).

Figure 5:
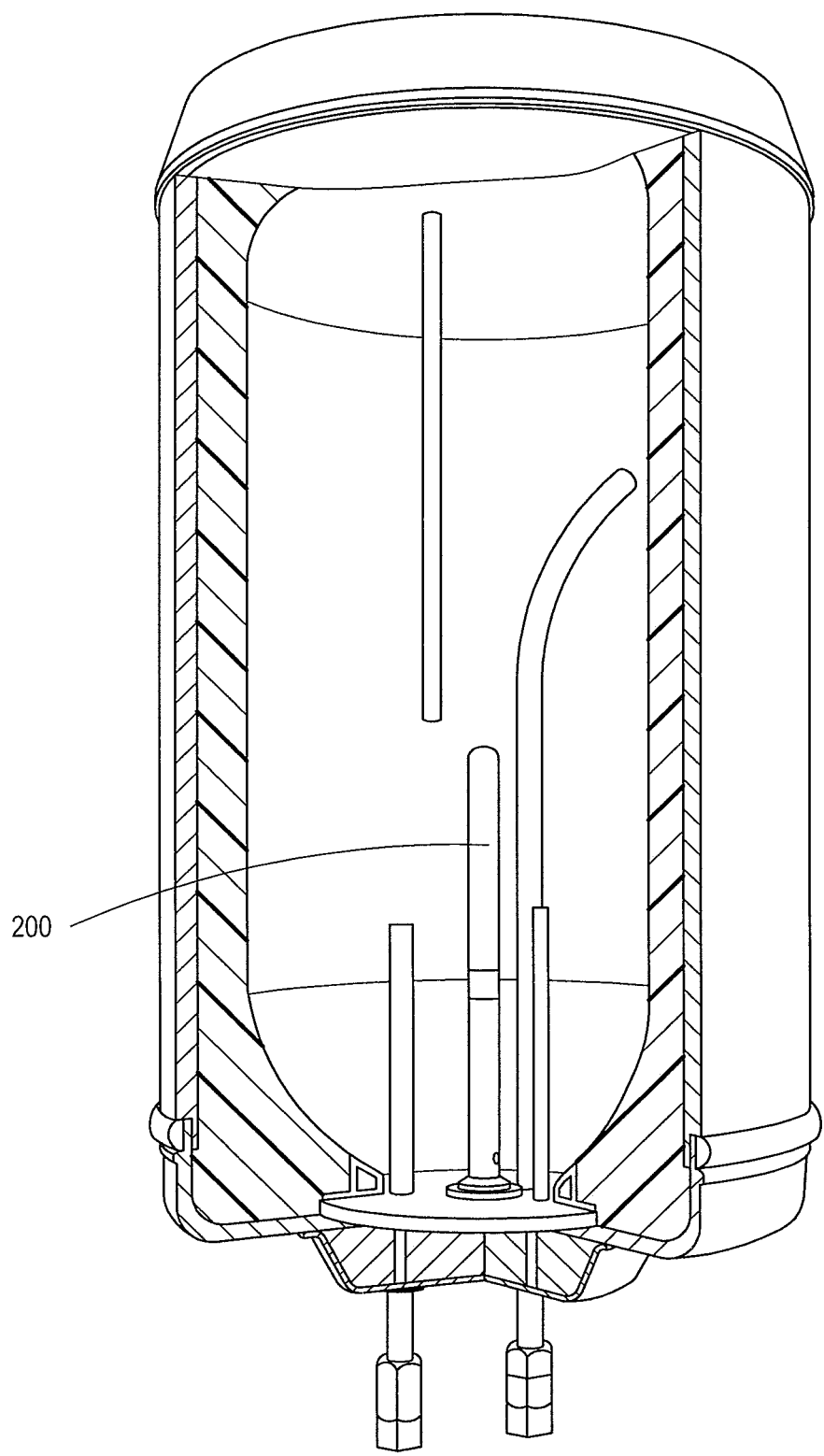
FIG. 5 is an illustration of the laser based water heating element of FIG. 2 installed in the floor of a water heater in accordance with an alternative embodiment of the invention.

FIG. 5 is an illustration of the laser based water heating element 200 of FIG. 2 installed in the floor of a water heater in accordance with an alternative embodiment of the invention. Here, a single laser based water heating element 200 is mounted to the base of the tank and oriented vertically. It should be understood that the laser based water heating element 200 is sized depending on the volume of water that needs to be heated. In certain embodiments, the sized of the heating element is commensurate with the size of the water heater. Thus, the laser based water heating element 200 could be "small" if it is intended for use in a water heater that is used in a residence. On the other hand, the laser based water heating element can be "large" if it is intended for use in larger sized water heaters, such as a water heater for industrial applications. Moreover, the number of heating elements can be increased in accordance with the size of the industrial water heater.

Figure 6:
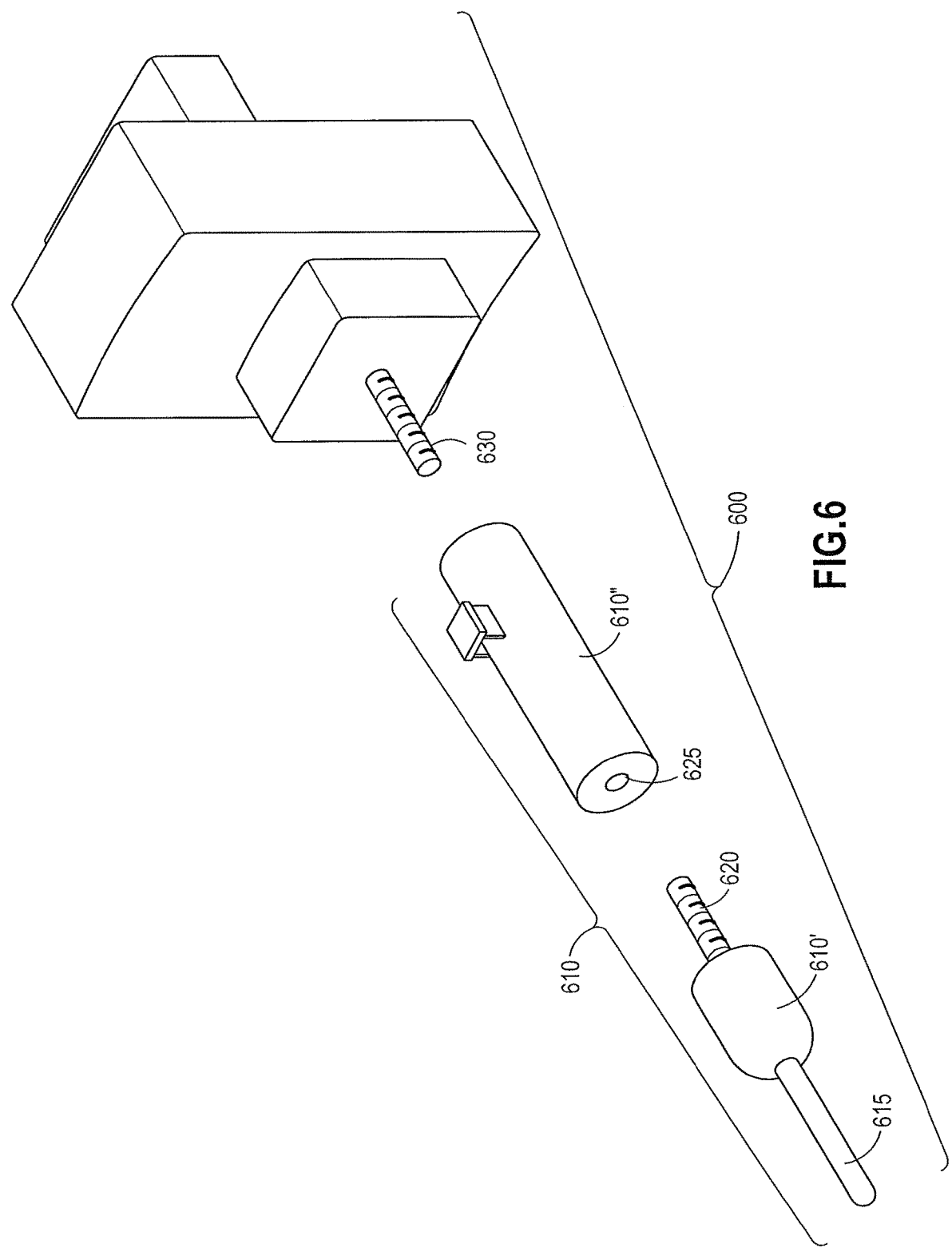
FIG. 6 is an illustration of the laser based water heater in accordance with an alternative embodiment of the invention.

FIG. 6 is an illustration of the laser based water heater in accordance with an alternative embodiment of the invention. In comparison to the embodiment of the laser based water heating element 200 in which the shaft is formed from multiple pieces in a male/female screw type arrangement, the laser based water heating element 600 of the presently contemplated embodiment is a shaft 610 formed from three major components. At the end distal to the laser beam generator (not shown here), i.e., an end metal part 610', the shaft 610 of the laser based water heating element 600 is formed from a metal material that varies depending on the application, i.e., the temperature requirement. In preferred embodiments, the material is titanium, tungsten or copper, where titanium/tungsten is used for commercial/industrial heaters and copper is used for domestic or residential heaters.

At the end proximate to the laser beam generator (not shown here), i.e., an end ceramic part 610", the shaft 610 is made from an inorganic, nonmetallic solid ceramic material comprising nonmetal or metalloid atoms.

The end metal part 610' includes an end projection 615 and a first threaded bolt 620 that is received in a central bore 625 that extends through the entirety of the end ceramic part 610", which allows the end metal part 610' and end ceramic part 610" to be secured together in an assembled state. The shaft 610 is secured to the remainder of the structure via a second threaded bolt 630 that is received in the central bore 625 extending the end ceramic part 610".

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A laser based water heating element, comprising:
a shaft; and
a laser beam generator which generates a laser beam with an output power which causes the shaft to generate radiant heat such that a temperature of water within a water heater rises;
wherein the shaft and laser beam generator of the laser based water heating element are axially aligned; and
wherein the laser beam generator is a self-contained green, infrared and red-line laser module with an integrated laser driver circuit, optics and laser diode.

2. The laser based water heating element of claim 1, wherein the shaft is centered on the laser beam generator.

3. The laser based water heating element of claim 1, wherein the shaft includes a threaded end which passes through a wall of the water heater.

4. The laser based water heating element of claim 1, wherein the shaft is formed from multiple pieces which are coupled together in a male/female screw type arrangement via a coupling element.

5. The laser based water heating element of claim 4, wherein the metal coupling element is formed from metal.

6. The laser based water heating element of claim 1, wherein at an end distal to the laser beam generator the shaft of the laser based water heating element is formed from a metal material.

7. The laser based water heating element of claim 6, wherein the metal material comprises one of titanium, tungsten or copper.

8. The laser based water heating element of claim 1, wherein at an end proximate to the laser beam generator the shaft is formed from an inorganic, nonmetallic solid ceramic material.

9. The laser based water heating element of claim 8, wherein the nonmetallic solid ceramic material comprises nonmetal or metalloid atoms.

10. The laser based water heating element of claim 1, further comprising:
an hollow inner area extending from an end, at which the laser beam generator is located, to an opposing end of the heating element.

* * * * *